Oct. 27, 1959  H. W. THYLEFORS  2,910,226
CONTINUOUSLY OPERATING CENTRIFUGAL SEPARATOR
Filed Dec. 12, 1956
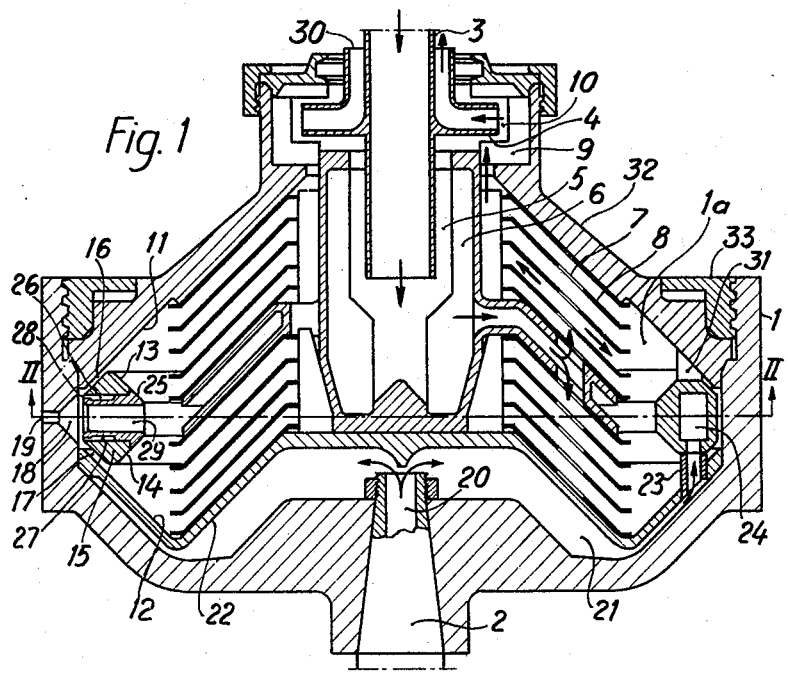
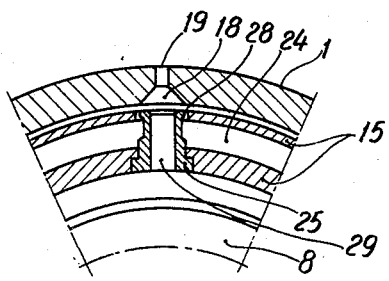
INVENTOR.
Henric Wilhelm Thylefors
BY
Davis, Hoxie & Faithfull
ATTORNEYS

United States Patent Office 2,910,226
Patented Oct. 27, 1959

2,910,226

CONTINUOUSLY OPERATING CENTRIFUGAL SEPARATOR

Henric Wilhelm Thylefors, Stockholm, Sweden, assignor to Aktiebolaget Separator, Stockholm, Sweden, a corporation of Sweden Application December 12, 1956, Serial No. 627,946

Claims priority, application Sweden December 16, 1955

11 Claims. (Cl. 233—14)

The present invention relates to continuously operating centrifugal separators which are adapted to separate from each other two different kinds of solid particles suspended in a liquid (e.g., particles of different specific gravity and/or shape) and the rotor of which has one or more channels conveying separated particles from the separating chamber of the rotor to one or more separating zones situated within outlet nozzles arranged along the periphery of the rotor, the separating zones being provided with means for supplying flushing liquid to them.

A separator of substantially the type described above is disclosed in U.S. Patent No. 2,599,619. In this separator the separating zones are formed by two generally parallel walls having an inclined position relative to the direction of the centrifugal force, the separated particles settling as a layer on the outermost (radially) of the two walls. Owing to the continuous supply to the separator of the suspension to be separated, the particles, in spite of their different settling speed, will be mixed together when forming the afore-mentioned layer. To separate particles of different settling speed, the layer of particles is sprinkled with a liquid, resulting in the particles being whirled up. The particles will then have the opportunity of separating from each other so that the particles with the higher settling speed can discharge through the nozzles together with a portion of the liquid, while the particles with the lower settling speed can go with the liquid not discharged through the nozzles into the separating chamber and from there out through the liquid outlet of the separator. In this way a separation is obtained of particles with different settling speed. In this separator, the particles with the lower settling speed must, however, after having been liberated from the said layer of particles through sprinkling with liquid, return through the separating zone in the same way as they entered it. This circumstance is, however, liable to have a disturbing effect upon the separation of the different kinds of particles from each other.

A similar separator design is shown in U.S. Patent No. 1,154,575. However, if this separator is used for separating starch particles from gluten particles in a starch suspension, a purpose for which the separator according to the present invention is principally adapted, excessive quantities of pure starch will go with liquid and gluten particles through the channel which leads directly out of the separator from the separating zone inside a nozzle. In this way, no satisfactory recovery of the pure starch is obtained from the starch suspension being separated.

In the following description, the suspension to be separated is assumed, for illustrative purposes, to be a starch suspension in which the starch particles have the greatest and the gluten particles the smallest settling speed.

The principal object of the present invention is to eliminate the disturbance of the separating operation mentioned in connection with U.S. Patent No. 2,599,619, and, regarding the separator according to U.S. Patent No. 1,154,575, to give the starch particles in the flow of material passing from the separating zone a repeated opportunity to be separated out so that a satisfactory separation of the pure starch particles from the gluten particles is obtained. This problem has been solved, according to the invention, by providing the separator with a radial channel, separate from the other channels, between a separating zone and the separating chamber, for conveying liquid and the slowest-settling particles inwardly. It is preferred to arrange a separating zone and a conveying channel for each nozzle, in which case the nozzles are preferably situated radially opposite each other.

According to a further feature of the invention, the longitudinal axes of the conveying channels are generally at right angles to the rotor axis so that the particles travelling inwards on their way toward the separating chamber encounter the least possible resistance. From a manufacturing and a balancing point of view, it is then advisable to arrange the conveying channels in an annular body inserted inside the nozzles in the interior of the rotor and concentric with the rotor axis. In order that the separated sludge shall not settle on this body but slide along it easily on its way toward the aforementioned separating zones, the side of the body facing the rotor axis has surfaces inclined relative to the direction of the centrifugal force. The invention is further characterized by the annular body having, on the side facing the nozzle, and for each conveying channel, an annular slot concentric with the longitudinal axis of the channel and communicating with the source supplying the flush liquid. In this way, all the separated starch is forced to pass a curtain of flush liquid so that the gluten particles are washed off from the starch before it can leave through the nozzle. Furthermore, it may be mentioned that each conveying channel can be arranged in a member inserted in the annular body, as this will simplify the arranging of the flush liquid supply, as by means of an annular channel located in the interior of the annular body and concentric therewith. The annular body can be supported in the rotor by a number of tubular members forming part of the channels for the flush liquid supply. According to one embodiment, the annular body can be supported from below by the tubular members which in their turn are supported by the bottom disc of a disc stack provided in the separating chamber. The position of the annular body in the interior of the rotor is further stabilized if the upper side of this body is rigidly pressed against the rotor body (or the rotor cover) by means of projections protruding from either the annular body or the rotor body (or its cover).

The invention will now be described in greater detail with reference to a preferred form of the separator shown in the attached drawing, in which:

Fig. 1 is a vertical sectional view of the separator, and

Fig. 2 a portion of a horizontal section on line II—II in Fig. 1.

The separator shown in Fig. 1 comprises a rotor body 1 and a spindle 2 supporting and driving the rotor. The starch suspension to be separated is supplied through a central stationary pipe 3 forming part of a paring disc 4. From the feed pipe 3 the suspension enters a space 5 in the rotor, and this space contains impeller vanes 6 by which the suspension is set in rotation. From the space 5 the suspension passes outwardly and through distributing holes 7 into a disc stack 8 located in the separating chamber 1a. The liquid displaced inwardly between the discs, carrying with it the slow-settling gluten particles, passes to a paring chamber 10 provided with impeller vanes 9. From paring chamber 10, the liquid together with the gluten particles is discharged by the stationary paring disc 4.

The starch particles settling more rapidly travel outwardly between the discs 8 and, together with a considerable portion of the gluten particles, impinge partly against the inclined interior sides 11 and 12 of the separating chamber and partly against the inclined sides 13 and 14 of an annular body 15 inserted in the rotor and concentric with the rotor axis. The particles thus separated them slide along these sides 11–14 into channel means which, as shown, are channels 16 and 17 formed between the sides 11 and 12 and the body 15, and hence into a separating zone 18. The latter is situated inside a nozzle 19 in the rotor wall. A plurality of such nozzles 19 are arranged in uniform distribution along the periphery of the rotor.

Flush liquid, which will be water in the case of separating a starch suspension, is introduced into the separator through a channel 20 in the spindle 2. From the channel 20, which may be considered a source of flushing liquid, the liquid passes into a space 21 defined by the rotor bottom and a bottom disc 22. The annular body 15 is supported at a number of points by tubular members 23 secured in the outer part of bottom disc 22. The tubes 23 conduct flush liquid from the space 21 into an annular channel 24 situated in the interior of the body 15 and concentric therewith. Inwardly from each nozzle 19 is a hollow member 25 inserted in a bore passing radially through the annular body 15. The member 25 constitutes means forming a generally radial channel 29, as will be further described presently. The hollow member 25 is so shaped that it does not entirely shut the channel 24 but leaves free slots 26 and 27 at the top and bottom, whereby the different parts of the channel 24 communicate with each other. From the channel 24 flush liquid can flow outward into each separating zone 18 through an annular slot 28 (Fig. 2) which is concentric with the longitudinal axis of the channel 29 extending through the corresponding hollow member 25.

The starch mass accumulating in each separating zone 18 is subjected to the action of the annular flush liquid curtain emerging through the opposed slot 28. The gluten particles are then flushed away, along with some starch, from the other starch which discharges with some liquid through the nozzle 19. The rate of the flush liquid supply through each slot 28 is limited so that the starch accompanying the liquid flowing radially inward through the channel 29 can be separated out again in the separating chamber of the centrifuge, while the main quantity of gluten particles coming from the separating zone 18 is entrained by the liquid flowing inward through the channel 29 into the paring chamber 10. From the latter, the glutinous liquid is discharged by the paring disc 4 through an outlet 30.

The annular body 15 is held rigidly in place from above by a number of projections 31 which are spaced evenly along the body 15 on the upper side thereof and which bear against the underside of the rotor cover 32. When the rotor cover is drawn by the locking ring 33 toward the rotor body 1, the projections 31 are pressed against the underside of the cover 32 so that the body 15 is held securely in its position in the interior of the rotor against the tubular members 23.

I claim:

1. In a continuously operating centrifugal separator adapted to separate from each other two kinds of solid particles of different settling speeds suspended in a liquid, the separator including a rotor having an inner separating chamber and an outlet nozzle located at the rotor periphery and containing a separating zone to which a flushing liquid is supplied, the rotor also having channel means in the form of an annular slot concentric with the rotor axis for conveying separated particles from said chamber to said separating zone, the improvement which comprises means in the rotor forming a generally radial channel separate from said channel means, said radial channel starting from said zone and opening into said chamber to form a passage by-passing said channel means, the radial channel being operable to convey the slowest-settling particles inward from said zone.

2. The improvement according to claim 1, in which the longitudinal axis of the generally radial channel is substantially at right angles to the rotor axis.

3. The improvement according to claim 1, comprising also an annular body in the rotor partly defining said channel means and located inwardly from the nozzle and concentric with the rotor axis, said radial channel being located in the annular body.

4. The improvement according to claim 1, comprising also an annular body in the rotor partly defining said channel means and located inwardly from the nozzle and concentric with the rotor axis, said means forming the generally radial channel being a hollow member inserted in the annular body.

5. The improvement according to claim 1, comprising also an annular body in the rotor partly defining said channel means and located inwardly from the nozzle and concentric with the rotor axis, said radial channel being located in the annular body, the side of said annular body facing the rotor axis having surfaces inclined relative to the direction of the centrifugal force.

6. The improvement according to claim 1, comprising also an annular body in the rotor located inwardly from the nozzle and concentric with the rotor axis, said radial channel being located in the annular body, the side of said annular body facing the nozzle having an annular slot concentric with the longitudinal axis of the generally radial channel, and a source of flushing liquid communicating with said slot.

7. The improvement according to claim 1, comprising also an annular body in the rotor located inwardly from the nozzle and concentric with the rotor axis, said radial channel being located in the annular body, the annular body containing an annular channel for flushing liquid.

8. The improvement according to claim 1, comprising also an annular body in the rotor located inwardly from the nozzle and concentric with the rotor axis, said means forming the generally radial channel being a hollow member inserted in the annular body and defining therewith an annular slot opening outwardly toward said zone, said body containing an annular channel for supplying flushing liquid to said slot.

9. The improvement according to claim 1, comprising also an annular body in the rotor located inwardly from the nozzle and concentric with the rotor axis, said radial channel being located in the annular body, and a tubular member for supplying flushing liquid to said zone and supporting the annular body in the rotor.

10. The improvement according to claim 1, comprising also an annular body in the rotor located inwardly from the nozzle and concentric with the rotor axis, said radial channel being located in the annular body, a disc stack located in the separating chamber and including a bottom disc, and a tubular member for supplying flushing liquid to said zone, the tubular member being supported by the bottom disc and supporting said annular body from below.

11. The improvement according to claim 1, comprising also an annular body in the rotor partly defining said channel means located inwardly from the nozzle and concentric with the rotor axis, said radial channel being located in the annular body, and a projection extending between the rotor and the annular body for holding said body in position in the rotor.

References Cited in the file of this patent

UNITED STATES PATENTS

| 1,519,419 | Peck | Dec. 16, 1924 |
| 2,599,619 | Eckers | June 10, 1952 |
| 2,636,670 | Aspegren | Apr. 28, 1953 |